UNITED STATES PATENT OFFICE.

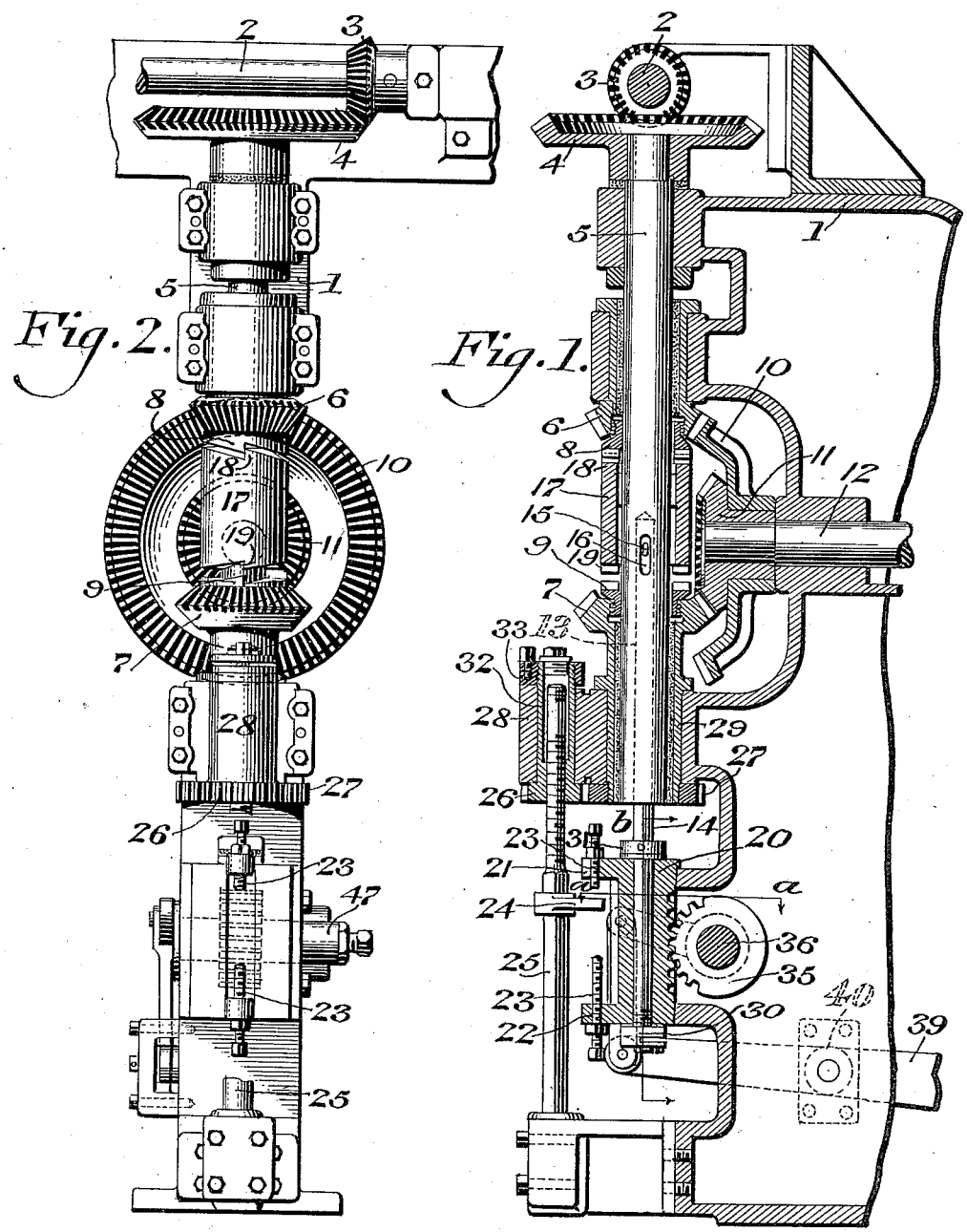

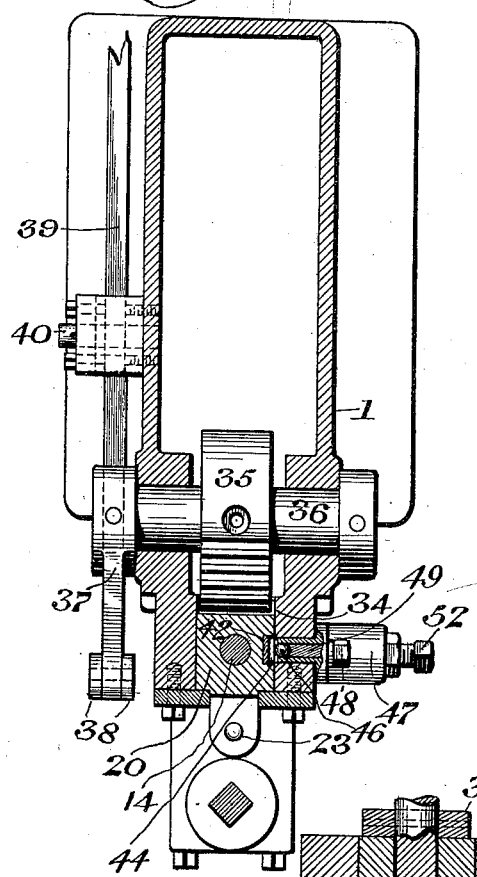

HENRY O. EVANS, OF PHILADELPHIA, PENNSYLVANIA.

REVERSING MECHANISM.

1,004,862.    Specification of Letters Patent.    Patented Oct. 3, 1911.

Application filed November 28, 1910. Serial No. 594,462.

*To all whom it may concern:*

Be it known that I, HENRY O. EVANS, a citizen of the United States, residing in the city and county of Philadelphia, State of Pennsylvania, have invented a new and useful Reversing Mechanism for Tapping-Machines, of which the following is a specification.

This invention relates to an improvement in reversing and gaging mechanism and more particularly to an improved type of clutch for direct and reverse driving which is adapted for use in a threading and tapping machine, although it will be understood the device is not limited to such use, as there are a variety of machines wherein it may be embodied.

It has for an object to improve the type of clutch reverse mechanism shown in my Patent No. 938,997, Nov. 2, 1909, in such a manner as to produce new and better results therewith and at the same time increase the safety of operation, not only to the operator of the mechanism but also of the machine itself.

In my prior patent mentioned above, the clutch and its adjuncts operate in a positive manner and any carelessness while in operation or adjustment may result in breaking the machine while in my present invention this is obviated by providing a mechanism so that the clutch may readily be released in either driving or reversing positions and the machine thereby immediately brought to a stand still.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Referring to the drawings: Figure 1 represents a vertical section of a portion of a machine embodying my invention. Fig. 2 represents an elevation of the same. Fig. 3 represents a section on line $x$—$x$, Fig. 1. Fig. 4 represents a section on line $y$—$y$, Fig. 1. Fig. 5 represents a portion of Fig. 3, certain parts being omitted. Fig. 6 represents a section showing the parts of Fig. 4 in a different position.

Similar numerals of reference indicate corresponding parts in the figures.

1 designates the frame of a suitable machine, the same in the present instance, being a tapping and gaging machine having the main driving shaft 2 carrying a bevel gear 3, meshing with a similar gear 4 keyed to the operating shaft 5 of the reversing mechanism, said shaft 5 being journaled in the main frame 1.

6 and 7 designate respectively, bevel gears suitably mounted for rotation on the operating shaft 5 and having clutch faces 8 and 9. The gear 6 in the present instance meshes with the gear 10 and the gear 7 with a gear 11, both gears being mounted on the driving shaft 12. It will be noted that the gear 10 is of somewhat larger diameter than the gear 11 and serves as a driving member during the working stroke, while the gear 11 is of smaller diameter and is used to give a quick return movement during the reversing operation, it of course being apparent that the arrangement of the gears 6 and 7 is such as to cause the shaft 12 to rotate in opposite directions. The shaft 5 is provided for a portion of its length with a bore 13, through which passes a rod 14 carrying in the present instance a pin 15, the latter as here shown passing through a slot 16 in the shaft 5 and united with the clutch sleeve 17, it of course being understood that this sleeve is provided with suitable clutch faces 18 and 19 for coöperation with the respective clutch faces 8 and 9. The rod 14 is secured to a block 20 mounted for sliding movement in the frame 1 and held against rotation in any suitable manner, the block as here shown, being of rectangular conformation for the purpose.

21 and 22 designate lugs secured to the block 20, each of which carries an adjustable member 23 so positioned as to be in the path of movement of a finger 24 fixedly secured, in the present instance, to a screw-threaded spindle 25, the latter in the present instance being reciprocated by means of suitable gearing 26 and 27. The gear 26 is rotatably mounted in a bracket 28 while the gear 27 is keyed to the sleeve 29 of the clutch gear 7. It will thus be apparent that rotation of the gear 26 will cause the threaded spindle 25 to move in one direction or the other and the finger 24 is thus brought into engagement with one or the other of the members 23, whereby the block 20 is shifted to cause the rod 14 to move the clutch sleeve 17 to engage one or the other of the clutch faces 8 or 9, thereby imparting either a direct drive to the shaft 12 or a reverse motion thereto. The block 20 in the present instance is secured to the rod 14 by means of a nut and thread connection 30 and collar 31, the latter maintaining the parts in correct relation. The gear 26 has preferably formed integral therewith a sleeve 32 which passes through the bracket 28 and is held in operative position by the medium of a lock nut 33, as will be apparent. In order to effect the manual control of the clutch mechanism, I preferably provide a rack 34 on the block 20, meshing with which is a segment 35 mounted on the rock shaft 36, the latter being suitably journaled in the main frame 1.

In operation, movement of the rock shaft is effected through the medium of a lever 37 suitably keyed thereto and connected by a link 38 to a hand or foot lever 39, suitably pivoted at 40 to the main frame 1 and it will thus be apparent that as the lever 39 is shifted it will transmit movement through the various connections as desired to the rock shaft 36 and cause the segment 35 to turn and either raise or lower the block 20 in the desired manner, thereby throwing the clutch face 18 into engagement with the clutch 8 or releasing these faces from engagement or throwing the clutch face 19 into engagement with the clutch 9 or removing it from engagement. Attention is directed to my novel friction means for assisting in maintaining certain of the clutch faces in engagement as the weight of the parts is such that after a movement to engaging position the clutch faces would frequently be disconnected, due to the weight of the several parts and thereby effect a reversing or stopping of the machine at the wrong time. This friction device consists in providing a recess 41 in the block 20 and locating therein a friction plate 42, the same being securely held in position by means of stud bolts 43 or the like.

44 designates a cut away portion of the plate 42 located adjacent which in the present instance is a substantially V-shaped recess 45 with which, in normal position of the parts, a ball member 46 coöperates to produce the friction necessary between the parts. This ball member 46 is located in a head 47 fixedly secured by bolts 48 or the like to the frame 1, the said head being provided with a piston 49 slidingly mounted therein and operating at one end against the ball 46 while its opposite end is engaged by a spring 50 bearing against a follower 51, the adjustment of which is controlled by the screw 52, the latter being held in adjusted position by the lock nut 53. It will be noted that the piston 49 is provided with a shoulder 49$^x$ adapted to contact with wall of the head 47 whereby its inward movement is limited, the function of this construction being to allow the ball member 46, to rest idly in the recess 44. It will thus be clear that the spring pressure is relieved as soon as this action takes place and therefore the friction member is released to permit gravity action. It will of course be understood that the tension of the spring 50 determines the friction necessary between the face of the block 20 and the main frame 1 and its tension should be just sufficient to hold the clutch in place during the cutting or machining operation but permit the clutch to be released just before the same is automatically unclutched thereby allowing the parts to drop by gravity into engagement with the reversing mechanism.

The operation of the device is as follows: Suitable parts to be machined having been placed in the device, the operator shifts the lever 39 to operate the segment 35 and raise the block 20, thereby throwing the clutch 18 of the sleeve 17 into engagement with the clutch 8, thereby rotating the gear 6 and the connected parts 10 and 12. While the machining operation is taking place the gears 26 and 27 cause the threaded spindle 25 to move and bring the finger 24 accurately toward the lower stop members 23. As soon as this member 24 engages the stop member 23 the block 20 is drawn downwardly, overcoming the friction of the plate 42 and withdrawing the clutch faces 8 and 18. The sleeve 17 thereupon drops by gravity to bring the reverse clutch devices 9 and 19 into engagement and the machine is driven in the reverse direction, of course at a higher speed than before, owing to the difference in diameter of the gears 10 and 11. The reverse operation feeds the rod 25 back to its former position carrying the finger 24 into engagement with the stop 23, whereupon the rod 14 is again raised and the reverse clutch faces released and the machine comes to a stop. It will of course be understood that at any time the machine may be brought to a stand still by manually operating the lever 39 thereby effecting a release of either the driving clutch faces or the reverse clutch faces, according to which set are in mesh at the time, a feature which is especially desirable, since it insures safety of the mechanism and prevents breakage of the tools.

It will now be apparent that I have devised a novel and useful construction of a reversing mechanism for tapping machine which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention what I claim as new and desire to secure by Letters Patent, is:—

1. In a device of the character stated, a frame, a shaft rotatable thereon, gears on said shaft, each of said gears having clutch faces, a sleeve slidingly mounted on said shaft for rotation therewith and having clutch faces adapted to engage said gear clutch faces, means operated by said shaft for shifting said sleeve, and manually operable means for shifting said sleeve toward or away from each gear clutch face.

2. In a device of the character stated, a frame, a shaft rotatable thereon, gears on said shaft, each of said gears having clutch faces, a sleeve slidingly mounted on said shaft for rotation therewith and having clutch faces adapted to engage said gear clutch faces, a block mounted on said frame for sliding movement, a connection between said sleeve and block, a rack on said block, a segment meshing with said rack and manually operable means for shifting said segment in either direction, whereby said sleeve is shifted toward or away from each gear clutch face.

3. In a device of the character stated, a frame, a shaft rotatable thereon, gears on said shaft, each of said gears having clutch faces, a sleeve slidingly mounted on said shaft for rotation therewith and having clutch faces adapted to engage said gear clutch faces, a rod secured to said sleeve and slidingly mounted in said shaft, means operated by said shaft for shifting said rod and friction means to control the movement of said sleeve.

4. In a device of the character stated, a frame, a shaft rotatable thereon, gears on said shaft, each of said gears having clutch faces, a sleeve slidingly mounted on said shaft for rotation therewith and having clutch faces adapted to engage said gear clutch faces, a rod secured to said sleeve and slidingly mounted in said shaft, means operated by said shaft for shifting said rod and manually operable means for shifting said rod, whereby said sleeve is shifted toward or away from each gear clutch face.

HENRY O. EVANS.

Witnesses:
ROBERT M. BARR,
C. D. McVAY.

Copies of this patent may be obtained for five cents each, by addressing the "Commissioner of Patents, Washington, D. C."